(12) United States Patent
Ng

(10) Patent No.: US 9,784,314 B2
(45) Date of Patent: Oct. 10, 2017

(54) THREE-SECTION SYNCHRONOUS CONCEALED SLIDE RAIL

(71) Applicant: GUANGDONG TAIMING METAL PRODUCTS CO. LTD, Foshan (CN)

(72) Inventor: Tai Wai Ng, Foshan (CN)

(73) Assignee: Guangdong Taiming Metal Products Co., Ltd., Foshan (CN)

( * ) Notice: Subject to any disclaimer, the term of this patent is extended or adjusted under 35 U.S.C. 154(b) by 0 days.

(21) Appl. No.: 14/749,198

(22) Filed: Jun. 24, 2015

(65) Prior Publication Data

US 2016/0128472 A1     May 12, 2016

(30) Foreign Application Priority Data

Nov. 10, 2014  (CN) .................... 2014 2 0667814 U

(51) Int. Cl.
| | |
|---|---|
| *A47B 88/00* | (2017.01) |
| *F16C 33/46* | (2006.01) |
| *F16C 29/00* | (2006.01) |
| *F16C 29/04* | (2006.01) |
| *F16C 33/38* | (2006.01) |
| *A47B 88/493* | (2017.01) |

(52) U.S. Cl.
CPC ............ *F16C 33/46* (2013.01); *A47B 88/493* (2017.01); *F16C 29/005* (2013.01); *F16C 29/04* (2013.01); *F16C 29/045* (2013.01); *F16C 29/046* (2013.01); *F16C 33/38* (2013.01); *A47B 2210/007* (2013.01); *A47B 2210/0072* (2013.01); *A47B 2210/0094* (2013.01); *F16C 2314/72* (2013.01)

(58) Field of Classification Search
CPC ........ F16C 33/46; F16C 33/38; F16C 29/005; F16C 29/04; F16C 29/045; F16C 29/046; A47B 88/10; A47B 88/04; A47B 88/0466
See application file for complete search history.

(56) References Cited

U.S. PATENT DOCUMENTS

| | | | | |
|---|---|---|---|---|
| 4,470,642 | A * | 9/1984 | Gasperin | A47B 88/10 312/331 |
| 5,607,238 | A * | 3/1997 | Sherman | F16C 29/00 384/49 |
| 6,015,199 | A * | 1/2000 | Netzer | A47B 88/10 312/334.46 |

(Continued)

FOREIGN PATENT DOCUMENTS

| | | | |
|---|---|---|---|
| AT | 511589 | * | 1/2013 |
| CN | 201977220 U | | 9/2011 |
| CN | 102551380 A | * | 7/2012 |

*Primary Examiner* — Hanh V Tran
(74) *Attorney, Agent, or Firm* — Maier & Maier, PLLC

(57) ABSTRACT

A three-section synchronous concealed slide rail includes a mobile rail, a middle rail, a fixed rail and a damping mechanism. An upper rack and an upper roller cage with an roller are installed between the mobile rail and the middle rail, a split-type lower roller cage with a roller is installed between the middle rail and the fixed rail, a surface of which is provided with a rack. A gear assembly is meshed between the upper rack and the lower roller cage and used for controlling synchronous or staggered operation of the mobile rail and middle rail according to the intensity of acting force, and the damping mechanism is installed on the fixed rail.

9 Claims, 8 Drawing Sheets

(56) References Cited

U.S. PATENT DOCUMENTS

| | | | | |
|---|---|---|---|---|
| 6,280,086 B1* | 8/2001 | Stijns | ............... | A47B 88/10 384/18 |
| 7,556,132 B2* | 7/2009 | Kornsteiner | ............ | F16D 7/028 192/56.1 |
| 7,866,772 B1* | 1/2011 | Chen | ............... | A47B 88/10 312/334.13 |
| 8,277,003 B2* | 10/2012 | Milligan | ............... | A47B 88/10 312/334.33 |
| 2004/0227444 A1* | 11/2004 | Booker | ............ | A47B 88/0422 312/334.45 |
| 2006/0091770 A1* | 5/2006 | Ritter | ............... | A47B 88/10 312/334.13 |
| 2006/0291765 A1* | 12/2006 | Hayward | ............ | F16C 19/502 384/572 |
| 2008/0303395 A1* | 12/2008 | Chen | ............... | A47B 88/10 312/334.8 |
| 2009/0238503 A1* | 9/2009 | Liang | ............... | A47B 88/10 384/18 |
| 2012/0248956 A1* | 10/2012 | Netzer | ............... | A47B 88/10 312/334.9 |
| 2013/0002115 A1* | 1/2013 | Friesenecker | ......... | A47B 88/10 312/334.8 |
| 2013/0076221 A1* | 3/2013 | Hammerle | ......... | A47B 88/0466 312/334.1 |
| 2013/0127319 A1* | 5/2013 | Breisacher | ............ | A47B 88/10 312/334.23 |
| 2013/0127320 A1* | 5/2013 | Greussing | ............ | A47B 88/10 312/334.44 |
| 2014/0241651 A1* | 8/2014 | Greussing | ............ | A47B 88/10 384/19 |
| 2015/0257536 A1* | 9/2015 | Chen | ............... | A47B 88/0466 384/18 |

* cited by examiner

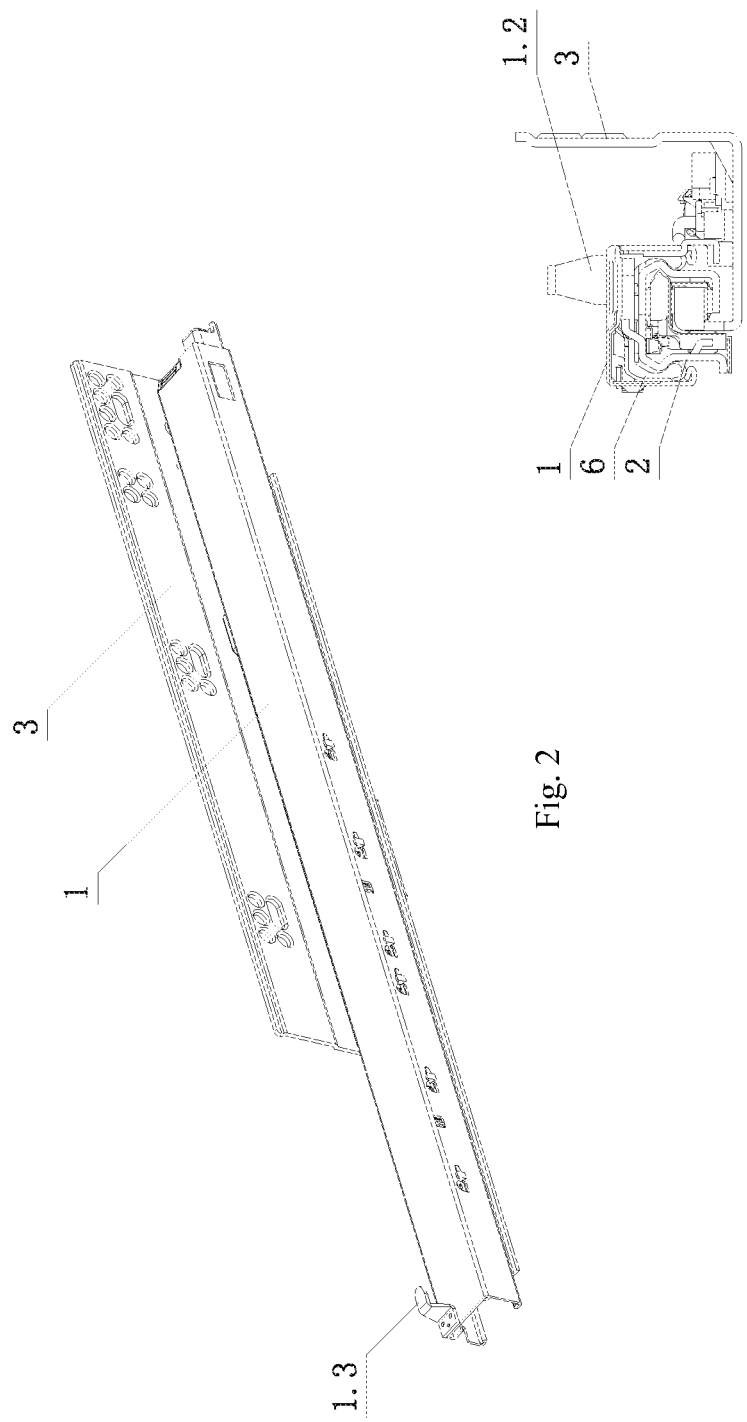

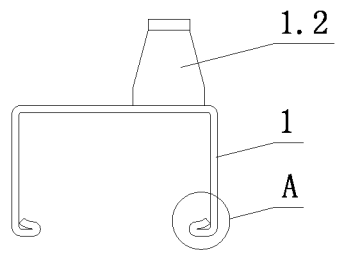
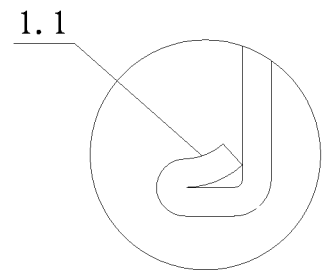
Fig. 16　　　　　　　Fig. 17
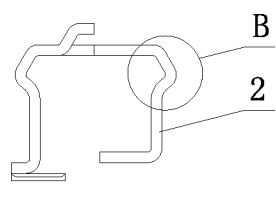
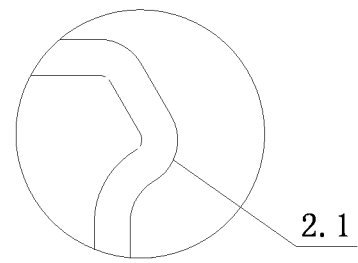
Fig. 18　　　　　　　Fig. 19
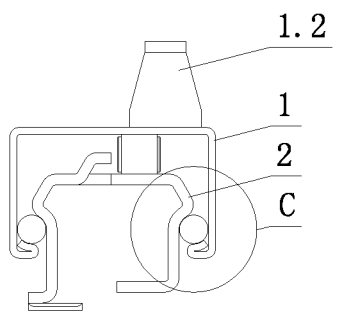
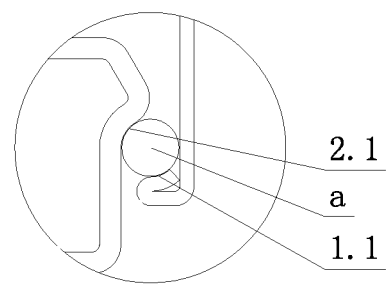
Fig.20　　　　　　　Fig.21

THREE-SECTION SYNCHRONOUS CONCEALED SLIDE RAIL

PRIORITY CLAIM

This application claims priority to China patent application 201420667814.6 filed Nov. 10, 2014, the contents of which are incorporated by reference in their entirety.

TECHNICAL FIELD

The utility model refers to a drawer slide rail, in particular a three-section synchronous concealed slide rail.

BACKGROUND

A slide rail type drawer is disclosed in Chinese patent document No. CN201120114555U, including a drawer, a slide rail and a box body, connecting two slide rails with the box body for each drawer, wherein three-section slide rail is adopted, including an upper rail, a middle rail and a bottom rail. The middle rail is provided with two mounting supporting planes, i.e. an upper mounting supporting planes and a lower mounting supporting plane, wherein the upper rail is sleeved on the upper mounting supporting plane of the middle rail and the bottom rail is sleeved on the lower mounting supporting plane. The lower part of the upper rail is provided with an upper rail rack pulley yoke and the upper part of the bottom rail is provided with a bottom rail rack pulley yoke. A gear is meshed between the upper rail rack pulley yoke and the bottom rail rack pulley yoke. A restorer is installed on the tail end of the upper rail, and a damper is installed on the tail end of the bottom rail. The upper rail and middle rail with this structure are operated separately. The gear, upper and lower racks may be deviated from the right position to affect the using effect, meanwhile, the rack and gear will be damaged. So, further improvement is necessary.

SUMMARY

The utility model is aimed at providing a three-section synchronous concealed slide rail featured with simple and reasonable structure, reliable performance, convenient operation and long service life, so as to overcome shortcomings in the prior art.

A three-section synchronous concealed slide rail designed for this purpose includes a mobile rail, a middle rail, a fixed rail and a damping mechanism, wherein an upper rack and an upper roller cage with an roller are installed between the mobile rail and the middle rail, a split-type lower roller cage with a roller is installed between the middle rail and the fixed rail, a surface of which is provided with a rack; a gear assembly is meshed between the upper rack and the lower roller cage and used for controlling synchronous or staggered operation of the mobile rail and middle rail according to the intensity of acting force, and the damping mechanism is installed on the fixed rail.

The gear assembly is composed of a gear A, a gear B and a gear carrier; the gear A is tightly matched and assembled with the gear B by means of polygonal column and polygonal hole; when rotating force is more than a certain value, the polygonal hole of the gear B is magnified and two gears are rotated in sliding; when rotating force is less than a certain value, two gears are rotated synchronously, assembled in the gear carrier in rotating and extended outwards up and down.

The gear carrier is fixed to the upper surface of the middle rail in a run-through way, the gear A runs through the gear B up and down, the lower part of the gear A is meshed with the rack on the lower roller cage, the upper part of the gear B is meshed with the upper rack, and two gears are never departed from the corresponding racks.

An inner top surface of the mobile rail is equipped with the upper rack in a disassembling way, multiple locking mechanisms are installed on the side of the upper rack, including fixed column and an elastic block; the mounting hole are correspondingly installed on the side of the mobile rail; running through the mounting hole, the fixed column is fastened, the fastened elastic block leans against the mounting hole to realize positioning, and the upper rack is integrated or split-type.

An irregular buffer plate is respectively installed on the front and back ends of the upper roller carrier and formed in an integrated way or assembled in split type with the upper roller carrier, multiple through holes for installing the roller are set on the surface of the upper roller carrier, the roller is exposed up and down, its top leans against the inner top surface of the mobile rail and its bottom leans against the upper surface of the middle rail; two sides of the upper roller carrier are bent downwards, and the bending ends are equipped with balls.

Away from the upper rack, at least two upper roller carriers are respectively installed on the front and rear ends of the upper rack and moved to and from front and back in the specified range.

The lower roller cage is installed in the middle rail and composed of a front cage, a lower rack and a rear cage, the front cage and the rear cage are respectively installed on the front and back ends of the lower rack; racks are installed on the surfaces of the front cage and the lower rack and installed with each other to form a matched and continuous rack, wherein the matched and continuous rack and the upper rack correspond to the gear assembly, respectively; rollers are installed on upper and lower parts and on the left and right sides of the front carrier and rear carrier, the roller on the upper surface and on the left and right sides are contact with the inner wall of the middle rail, respectively; and the roller on the lower surface leans against the fixed rail.

The mobile rail and middle rail are designed to tubular bodies with open bottoms, secondary edgefolds are adopted on the opening sides on two sides of the mobile rail to form a strip concave edge with circular arc, two sides of the middle rail are bent, irregular convex edges are adopted to form a strip boss with circular arc, the mobile rail is embedded on the middle rail, the balls on the upper roller cage is located between the concave edge and the boss, and mutual circular arc surfaces are matched with the surfaces of balls, respectively.

The damping mechanism includes a buffer and fixed mount, the buffer is fixed to the fixed rail by the fixed mount, and buffer acting force acts on the mobile rail.

The slide rails are symmetrically installed on two sides of the cabinet chamber and fixed by the mounting hole on the fixed rail, and the mobile rail is connected with the drawer.

The utility model realizes synchronous operation of the mobile rail and middle rail by installing the gear assembly when the acting force is less than a certain value, as well as separated operation when the acting force is more than a certain value, so as to ensure the gear is matched with the upper and lower racks on the right position to be continue to use the slide rail, and the rack and gear are difficult to be damaged. The gear assembly includes a gear A and a gear B, which are tightly matched and assembled by polygonal column and polygonal hole, respectively. When the acting force is more than a certain value, the polygonal hole of the gear B is magnified, two gears are rotated in sliding. When the acting force is less than a certain value, two gears are rotated synchronously to realize the effect. The lower roller cage is set in split type and featured with simple and reasonable structure, reliable performance, convenient operation and long service life.

FIGURE DESCRIPTION

FIG. 2 shows a schematic diagram of assembly structure in the utility model.

FIG. 3 shows a schematic diagram of side structure in the utility model.

FIG. 16 shows a schematic diagram of side structure of mobile rail in the utility model.

FIG. 17 shows a schematic diagram of amplifying structure at position A in FIG. 16.

FIG. 18 shows a schematic diagram of side structure of mobile rail in the utility model.

FIG. 19 shows a schematic diagram of amplifying structure at position B in FIG. 18.

FIG. 20 shows an assembly side view of mobile and middle rail.

FIG. 21 shows a schematic diagram of amplifying structure at position C in FIG. 20.

DETAILED DESCRIPTION

The utility model will be further described by combining with the following attached figures and embodiments.

Figure 1:
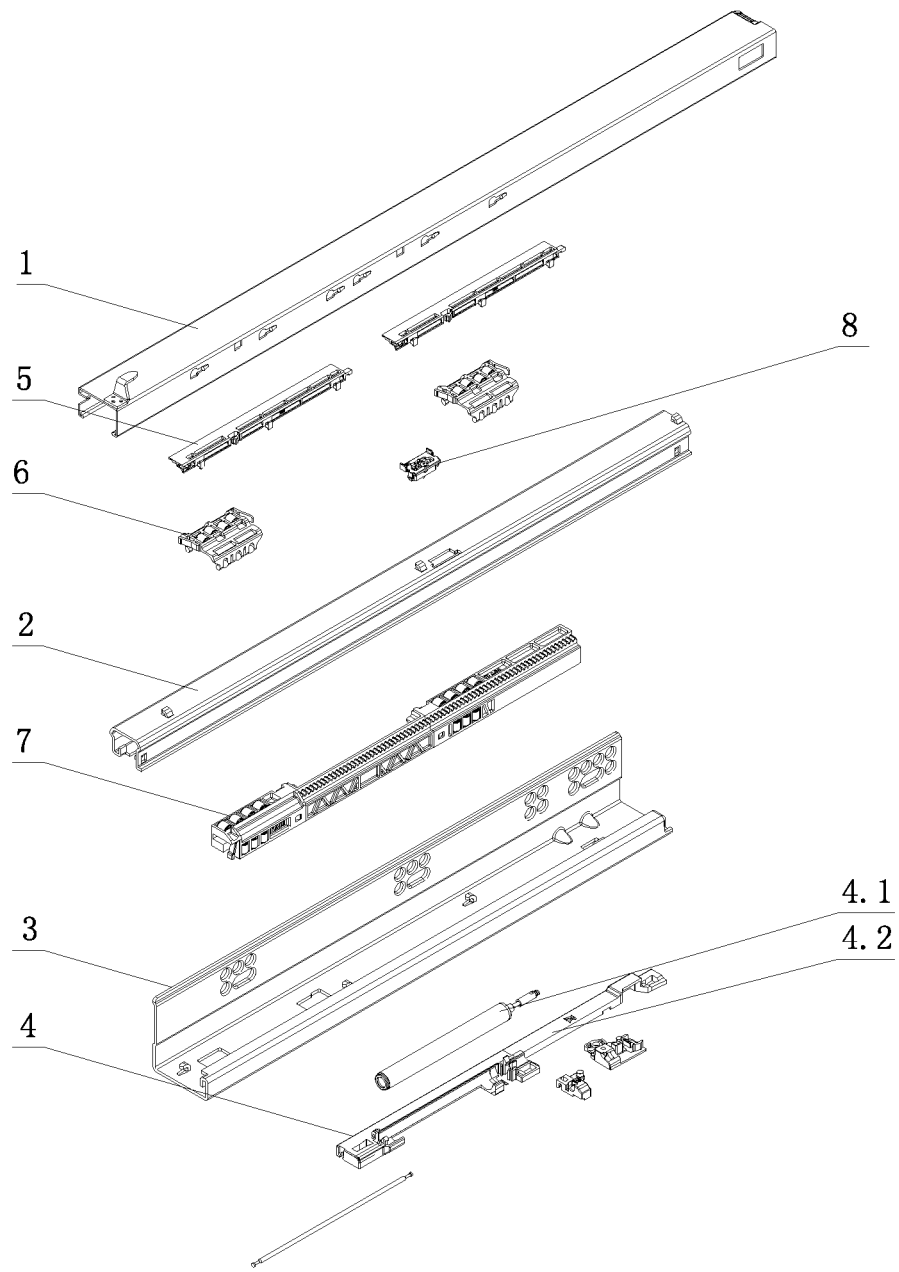
FIG. 1 shows a schematic diagram of breakdown structure in the utility model.

As shown in FIG. 1-3, the three-section synchronous concealed slide rail includes a mobile rail 1, a middle rail 2, a fixed rail 3 and a damping mechanism 4, wherein an upper rack 5 and an upper roller cage 6 with an roller are installed between the mobile rail 1 and the middle rail 2, a split-type lower roller cage 7 with a roller is installed between the middle rail 2 and the fixed rail 3, a surface of which is provided with a rack; a gear assembly 8 is meshed between the upper rack 5 and the lower roller cage 7 and used for controlling synchronous or staggered operation of the mobile rail 1 and middle rail 2 according to the intensity of acting force, and the mobile rail 1, the middle rail 2 and the damping mechanism 4 are installed on the fixed rail 3, respectively. The slide rails are installed on two sides in the cabinet chamber symmetrically and fixed by a mounting hole 3.1 on the fixed rail 3, and the mobile rail 1 is connected with the drawer.

Figure 4:
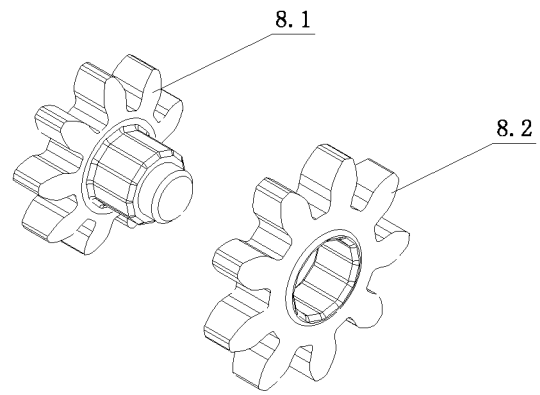
FIG. 4 shows a schematic diagram of breakdown structures of gear A and gear B in the utility model.
Figure 5:
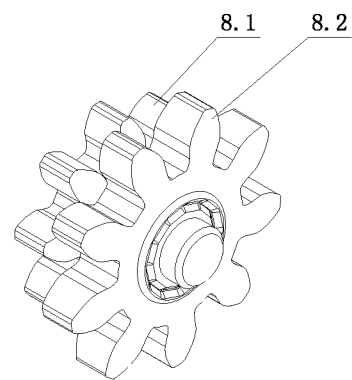
FIG. 5 shows a schematic diagram of assembly structures of gear A and gear B in the utility model.
Figure 6:
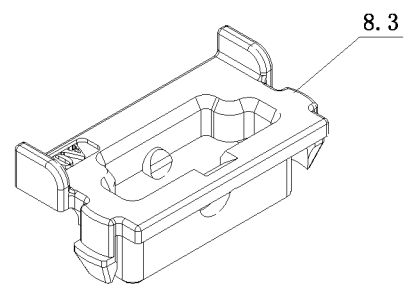
FIG. 6 shows a schematic diagram of three-dimensional structure of gear carrier in the utility model.

Specially, as shown in FIG. 4-6, the gear assembly 8 is composed of a gear A 8.1, a gear B 8.2 and a gear carrier 8.3; the gear A 8.1 is tightly matched and assembled with the gear B 8.2 by means of polygonal column and polygonal hole; when rotating force is more than a certain value, the polygonal hole of the gear B is magnified and two gears are rotated in sliding; when rotating force is less than a certain value, two gears are fixed relatively, so they are rotated synchronously, assembled in the gear carrier 8.3 in rotating and extended outwards up and down. The gear carrier 8.3 is inserted in the square hole on the upper surface of the middle rail 2, running through the hole. The whole gear assembly 8 is fixed to the middle rail 2 by the fasters on two sides of the gear carrier 8.3. The gear A 8.1 and the gear B 8.2 protrude by means of running through up and down. The lower part of the gear A 8.1 is meshed with the rack on the lower roller cage 7, the upper part of the gear B 8.2 is meshed with the upper rack 5, and two gears are never departed from corresponding racks in the operating process.

Figure 7:
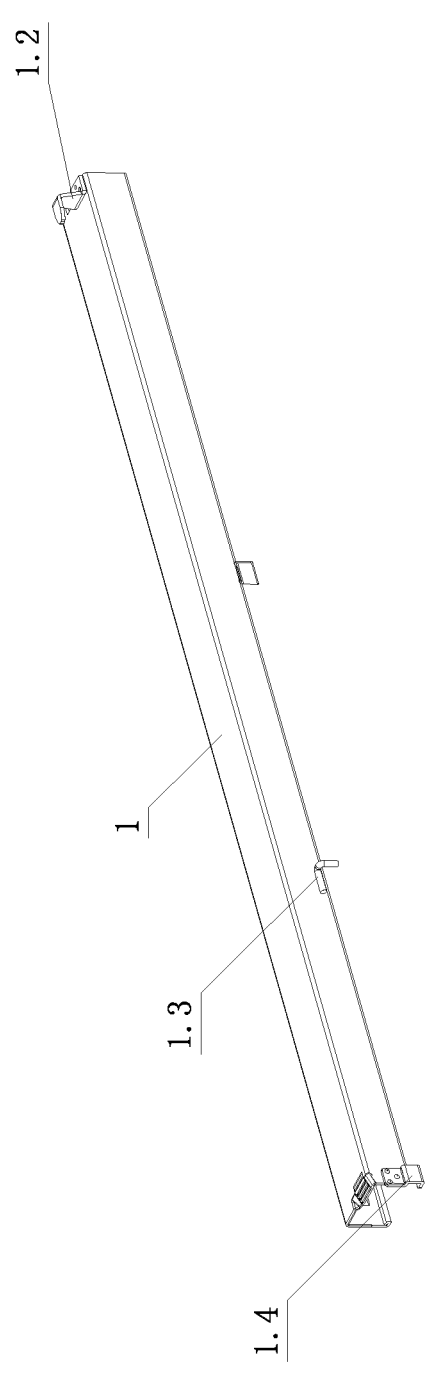
FIG. 7 shows a front space diagram of mobile rail in the utility model.
Figure 8:
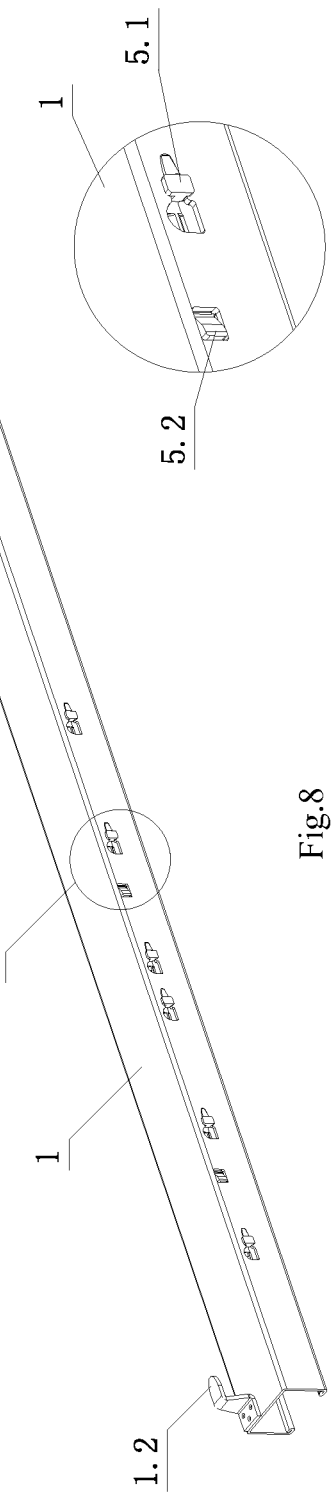
FIG. 8 shows a back space diagram of mobile rail in the utility model.
Figure 9:
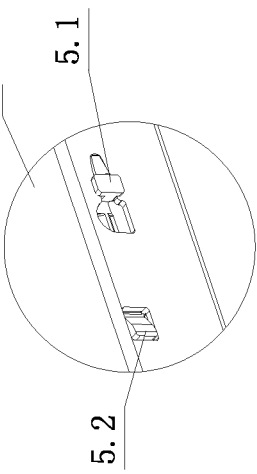
FIG. 9 shows a schematic diagram of amplifying structure at position D in FIG. 8.

As shown in FIG. 7-9, the inner top surface of the mobile rail 1 is equipped with the upper rack 5, and multiple locking mechanisms are convex outwards on the side of the upper rack 5, including a fixed column 5.1 and an elastic block 5.2, wherein the top of the fixed column 5.1 is stretched outwards, and the elastic block 5.2 is bounced outwards; the mounting hole is correspondingly set on the side of the mobile rail 1, the mounting hole corresponding to the fixed column 5.1 is convex-shaped. The fixed column 5.1 is conducted to pass through the big side and moved to the narrow side to finish fastening. The mounting hole corresponding to the elastic block 5.2 is square, the elastic block 5.2 extends into the square mounting hole in the fastening state and leans against its side wall, and the upper rack 5 is composed of two parts by connecting.

Figure 10:
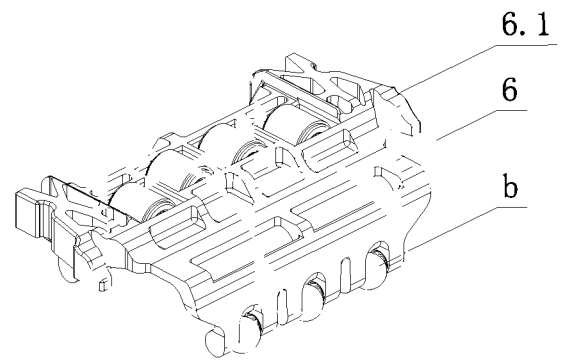
FIG. 10 shows a schematic diagram of three-dimensional structure of middle and upper roller cages in the utility model.
Figure 11:
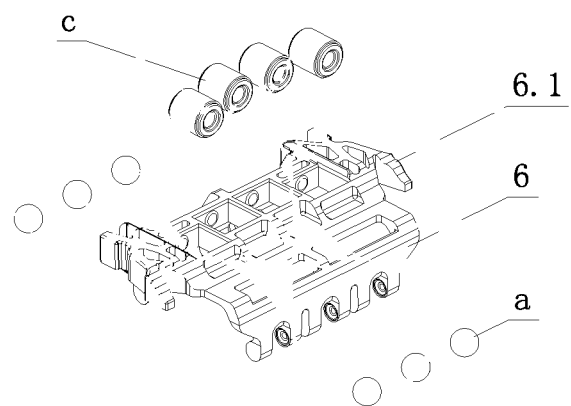
FIG. 11 shows a schematic diagram of breakdown structure of upper roller cage.
Figure 12:
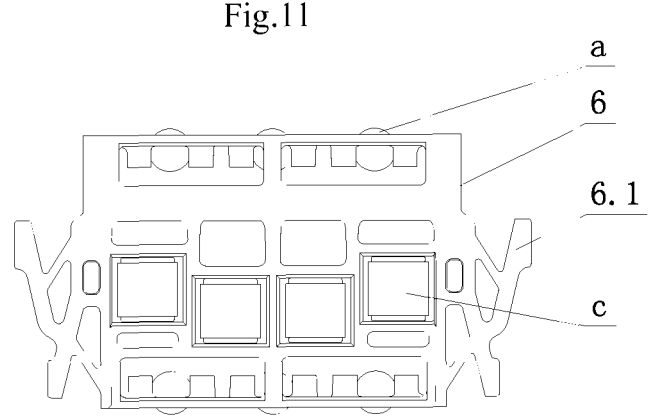
FIG. 12 shows a schematic diagram of overhead structure of upper roller cage.

As shown in FIG. 10-12, an irregular buffer plate 6.1 is respectively installed on the front and back ends of the upper roller carrier 6 and formed in an integrated way with the upper roller carrier 6, reliable buffer function is provided in case of impact, so as to effectively protect the upper roller cage 6 and remove noise and vibration caused by impact. Four through holes are set on the surface of the installing the upper roller cage 6. Convex points are set on the left and right of the through hole coaxially for assembling the roller c and ensuring the roller c to be rotated freely without taking off. The upper and lower parts of the roller c are exposed, and its top leans against the inner top surface of the mobile rail 1, and its bottom leans against the upper surface of the middle rail 2. Two sides of the upper roller cage 6 are bent, and the bending end on each side is equipped with three balls a, which are 4 mm plastic balls for ensuring free rolling without taking off. Away from the upper rack 5, at least two upper roller carriers 6 are respectively installed on the front and rear ends of the upper rack 5 and moved to and from front and back in the specified range.

Figure 13:
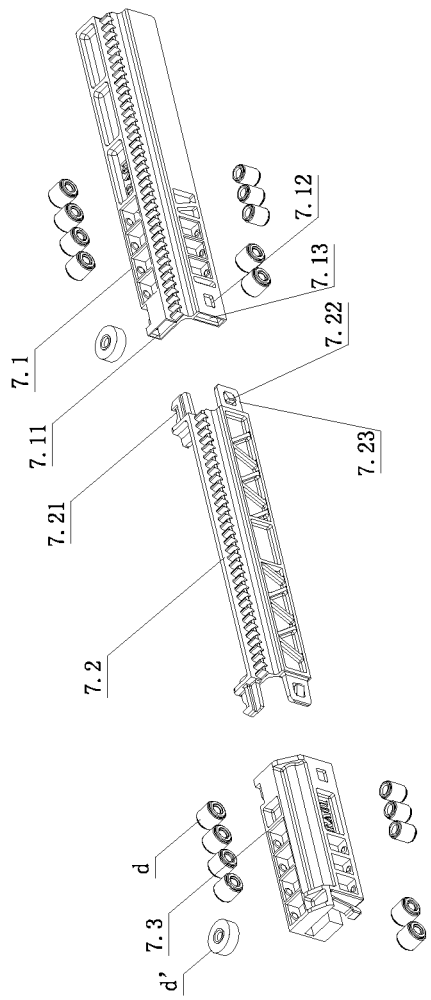
FIG. 13 shows a schematic diagram of breakdown structure of middle and lower roller cages in the utility model.
Figure 14:
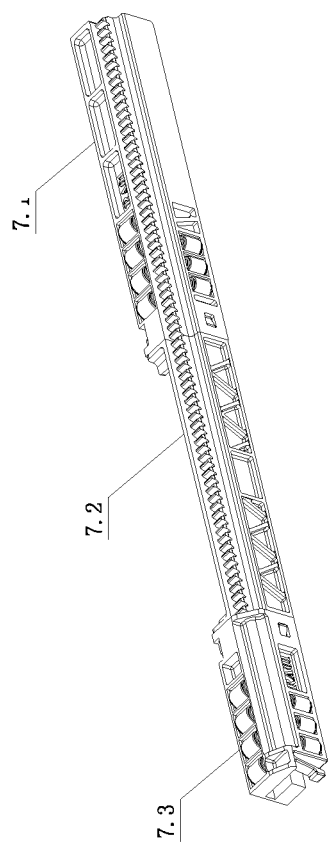
FIG. 14 shows a schematic diagram of assembly structure of lower roller cage.
Figure 15:
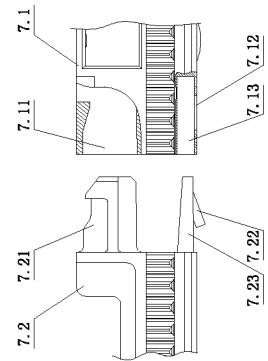
FIG. 15 shows a schematic diagram of local amplifying structure at junction of front cage and lower rack.

As shown in FIG. 13-15, the lower roller cage 7 is installed in the middle rail 2 and composed of a front cage 7.1, a lower rack 7.2 and a rear cage 7.3, the front cage 7.1 and the rear cage 7.3 are respectively installed on the front and back ends of the lower rack 7.2. an upper square column 7.21 with button placement and a lateral square column 7.23 with elastic block 7.22 are convex on the front and rear ends of the lower rack 7.2, respectively; the mounting mouths of front cage 7.1 and rear cage 7.3 are respectively equipped with an upper square hole 7.11 and a lateral square hole 7.13, wherein the upper square column 7.21 is inserted into the upper square hole 7.11 and fastened, and the lateral square column 7.23 is inserted into the lateral square hole 7.13. The elastic block 7.22 is popped into the square hole on the lateral square hole 7.13, and they are matched with each other to realize connection. The rear cage 7.3 is connected with the lower rack 7.2 in a same way. Racks are installed on the surfaces of the front cage 7.1 and the lower rack 7.2 and installed with each other to form a matched and continuous rack, wherein the matched and continuous rack and the upper rack 5 correspond to the gear assembly 8, respectively, wherein the gear A 8.1 is meshed at the rack composed of the front cage 7.1 and lower rack 7.2, and the gear B 8.2 is meshed at the upper rack 5, so as to realize synchronous or staggered operation of the upper rack 5 and the lower roller cage 7. Rollers d and d' are set on the upper and lower parts and on the left and right of the front cage 7.1 and the rear cage 7.3, respectively. The roller on the upper surface and on the left and right sides are contact with the inner wall of the middle rail 2, respectively; and the roller on the lower surface leans against the fixed rail 3.

As shown in FIG. 16-21, the mobile rail 1 and middle rail 2 are designed to tubular bodies with open bottoms, secondary edgefolds are adopted on the opening sides on two sides of the mobile rail 1 to form a strip concave edge 1.1 with circular arc, two sides of the middle rail 2 are bent, irregular convex edges are adopted to form a strip boss 2.1 with circular arc, the mobile rail 1 is embedded on the middle rail 2, the balls a on the upper roller cage 6 is located between the concave edge 1.1 and the boss 2.1, and mutual circular arc surfaces are matched with the surfaces of balls a, respectively.

The damping mechanism 4 includes a buffer 4.1 and fixed mount 4.2, the buffer 4.1 is fixed to the fixed rail 3 by the fixed mount 4.2, and buffer acting force acts on the mobile rail 1.

Figure 22:
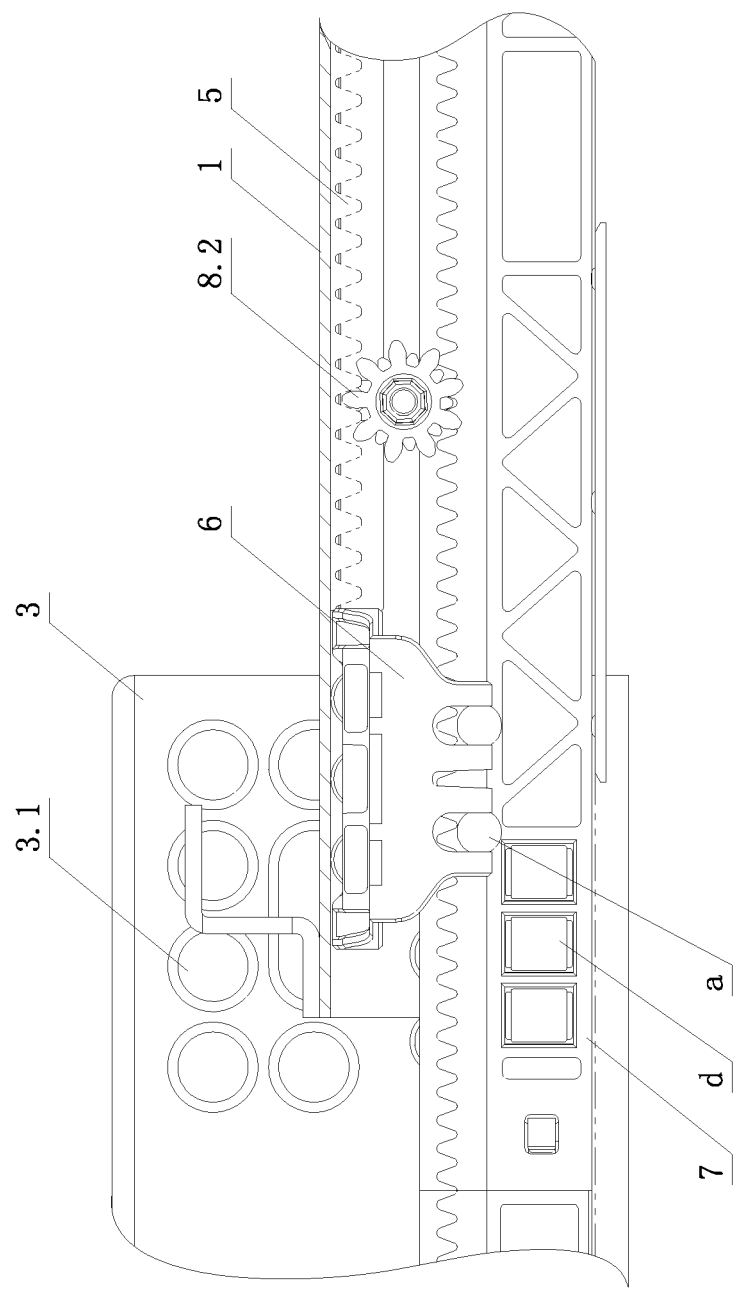
FIG. 22 shows a local usage stage drawing of the utility model.

As shown in FIG. 22, when the drawer is closed, the mobile rail 1, the middle rail 2 and the fixed rail 3 are overlapped up and down; when the drawer is pulled out, the mobile rail 1 is pushed or pulled, the mobile rail 1 and the middle rail 2 are synchronously operated whenever and wherever possible under the action of the gear assembly 8 and upper and lower racks. When the external force is provided and more than a certain value, the gear is staggered with the upper and lower racks. At this moment, it just needs to continue to pull the mobile rail 1 completely, a double-gear structure will be rotated relatively to ensure that the gear assembly 8 is matched with the upper and lower racks on the right position, so that three-section synchronous effect and function of the slide rail can be used sequentially, and both the rack and gear will be difficult to be damaged.

Optimal scheme of the utility model is described as the above, its simple modification or renovation by common technician in the field is in the protective range of the utility model completely.

The invention claimed is:

1. A three-section synchronous concealed slide rail, comprising: a mobile rail, a middle rail, a fixed rail and a damping mechanism, wherein an upper rack and an upper roller cage with a roller are installed between the mobile rail and the middle rail, a split-type lower roller cage with a roller is installed between the middle rail and the fixed rail, a surface of which is provided with a rack; a gear assembly is meshed between the upper rack and the lower roller cage and used for controlling synchronous or staggered operation of the mobile rail and middle rail according to the intensity of acting force, and the damping mechanism is installed on the fixed rail;

wherein the lower roller cage is installed in the middle rail and composed of a front cage, a lower rack and a rear cage, the front cage and the rear cage respectively installed on the front and back ends of the lower rack, each of the front cage and the rear cage being separably coupled to the lower rack;

wherein the upper rack is removably coupled to an inner top surface of the mobile rail;

wherein multiple locking mechanisms are installed on the side of the upper rack, each of the locking mechanisms including a fixed column and an elastic block;

wherein a plurality of mounting holes are correspondingly installed on the side of the mobile rail;

wherein the upper rack is configured to be removably coupled to the mobile rail by running the fixed column through the mounting hole, fastening the fixed column, and leaning the fastened elastic block against the mounting hole to realize positioning; and wherein the upper rack comprises a plurality of upper rack portions.

2. The three-section synchronous concealed slide rail according to claim 1, wherein the gear assembly is composed of a gear A, a gear B and a gear carrier;

wherein the gear A is tightly matched and assembled with the gear B by a coupling, the coupling comprising a polygonal column disposed on the gear A and a polygonal hole disposed through the gear B;

wherein the coupling is configured such that, when rotating force is more than a certain value, the polygonal hole of the gear B is magnified and two gears are rotated in sliding, and when rotating force is less than a certain value, two gears are rotated synchronously.

3. The three-section synchronous concealed slide rail according to claim 2, wherein the gear carrier is fixed to the upper surface of the middle rail in a run-through way;

wherein the two gears are assembled such that the gear A runs through the gear B up and down;

wherein the lower part of the gear A is meshed with the rack on the lower roller cage, the upper part of the gear B is meshed with the upper rack, and the two gears are never departed from the corresponding racks.

4. The three-section synchronous concealed slide rail according to claim 1, wherein an irregular buffer plate is respectively installed on each of the front and back ends of the upper roller cage, and wherein the irregular buffer plate at each of the front and the back end of the upper roller cage is integrally formed with the body of the upper roller cage; wherein multiple through holes for installing the roller are set on the surface of the upper roller cage;

wherein the roller is exposed up and down such that its top leans against the inner top surface of the mobile rail and its bottom leans against the upper surface of the middle rail;

and wherein two sides of the upper roller cage are bent downwards, and wherein balls are disposed in bent portions of the sides of the upper roller cage.

5. The three-section synchronous concealed slide rail according to claim 4, wherein at least two upper roller cages are respectively installed on the front and rear ends of the upper rack, such that the two upper roller cages are separate components movable on the upper rack and are movable over a portion of the upper rack.

6. The three-section synchronous concealed slide rail according to claim 1, wherein the lower roller cage comprises a matched and continuous rack, the matched and continuous rack consisting of a front-cage rack installed on the surface of the front cage and a lower-rack rack installed on the surface of the lower rack, wherein the front-cage rack and the lower-rack rack are installed with each other to form a matched and continuous rack, wherein the matched and continuous rack and the upper rack correspond to the gear assembly, respectively;

wherein rollers are installed on upper and lower parts and on the left and right sides of the front cage and rear cage, the roller on the upper surface and on the left and right sides are contact with the inner wall of the middle rail, respectively; and wherein the roller on the lower surface leans against the fixed rail.

7. The three-section synchronous concealed slide rail according to claim 4, wherein the mobile rail and middle rail each comprise tubular bodies with open bottoms; wherein secondary edge folds are adopted on the opening sides on two sides of the mobile rail to form a strip concave edge with circular arc;

wherein two sides of the middle rail are bent;

wherein irregular convex edges are adopted to form a strip boss with circular arc;

wherein the mobile rail is embedded on the middle rail;

wherein the balls on the upper roller cage are located between the concave edge and the boss; and wherein mutual circular arc surfaces are matched with the surfaces of the balls, respectively.

8. The three-section synchronous concealed slide rail according to claim 1, wherein the damping mechanism includes a buffer and fixed mount;

wherein the buffer is fixed to the fixed rail by the fixed mount; and wherein the buffer is configured such that the buffer acting force acts on the mobile rail.

9. The three-section synchronous concealed slide rail according to claim 1, wherein the slide rail is paired with a second three-section synchronous concealed slide rail in a plurality of slide rails, and wherein the plurality of slide rails are symmetrically installed on two sides of a cabinet chamber;

wherein each of the slide rail and the second slide rail is fixed to a side of the cabinet chamber by the mounting hole on the fixed rail; and wherein the mobile rail of each of the slide rail and the second slide rail is connected to a drawer.

* * * * *